Aug. 25, 1936.　　　　　E. FISCHEL　　　　　2,051,837

AUTOMATIC CONTROL ARRANGEMENT FOR AIRCRAFT

Filed July 1, 1935

Inventor:
Edward Fischel
by
Lorka & Kellenberk
Attorneys.

Patented Aug. 25, 1936

2,051,837

UNITED STATES PATENT OFFICE 2,051,837

AUTOMATIC CONTROL ARRANGEMENT FOR AIRCRAFT

Eduard Fischel, Berlin Tempelhof, Germany, assignor to Siemens Apparate und Maschinen Gesellschaft mit beschränkter Haftung, Berlin, Germany, a corporation of Germany Application July 1, 1935, Serial No. 29,201
In Germany July 5, 1934

4 Claims. (Cl. 244—29)

It is known to provide in automatic rudder controls rigid return by the motor or the rudder, respectively, for the regulating part of the rudder engine, adjusted by the controlling devices. In this case the deflection of the rudder obtained is in proportion to the deviation of the aircraft from its theoretical position, determined by suitable measuring instruments, such as compass, inclinometer, and the like. An aircraft, provided with such automatic controlling equipment must deviate from its theoretical course or its theoretical position, respectively, if it is influenced for a considerable time by a uni-laterally acting disturbance, since a deflection of the rudder can only be effected by a deviation of the direction transmitters. If then in known manner in place of a rigid return a yielding return of the regulating part of the rudder engine is adopted, the effect will be in the supposed case of uni-lateral disturbance of the position of equilibrium, that the deflection of the rudder will be increased within a short time to such extent, that this disturbance will be fully compensated, bringing the aircraft back to the intended course or the intended position of equilibrium, respectively.

With aircraft having a wide range of speed, as, for instance, modern airplanes, special demands are made on the automatic control equipment in consequence of the fact, that with low speed large deflections of the rudder are necessary for controlling, and with high speed very small deflections of the rudder. Adapting these control equipments for low speed does not present any difficulties. But with high speeds the deflections of the rudder become so small, that owing to inaccuracies of friction, looseness in the joints of the control mechanism, and the like, exact control is not possible any longer. As it is not the object of automatic control to deal with the exceptional range of low speeds (when starting and landing), but rather to control the airplane above this range, the normal regular range can be reduced to a fraction of the total range of the deflection of the rudder.

According to the invention the arrangement with automatic control of the rudder with yielding return of the regulating part is such, that although with maximum deflection of the controlling instruments a maximum displacement of the regulating part is attained, a rudder movement results, amounting to one half or less than one half of the largest possible deflection of the rudder, while the yielding member arranged in the return arrangement of the regulating part is so designed that it permits, in consequence of the shortening or the lengthening of the return gear of at least doubling the deflection of the rudder obtainable by control by means of instruments.

By these measures the movements of the control rod arrangement and the regulating part are proportionally increased with regard to the movements of the rudder and the disadvantages, above referred to, are decreased in the same degree. The yielding arrangement (isodrome arrangement) inserted into the return is now capable, with continuing disturbance, of shifting the zero point of the regular range, intended for the controlling instruments, at any rate to such an extent, that the uni-laterally acting disturbance is sure to be compensated. Notwithstanding the compensation of the disturbance factor the limited regular range assigned to the controlling instruments is fully maintained.

In order to be able to compensate as soon as possible material changes of trim, occurring comparatively quickly, a further feature of my invention consists in constructing the yielding member inserted in the return in such a manner, that its action is accelerated with large and quick displacements of the rudder.

This construction and other particulars of the invention are elucidated by two modes of construction shown by diagrams in the drawing.

Figure 1:
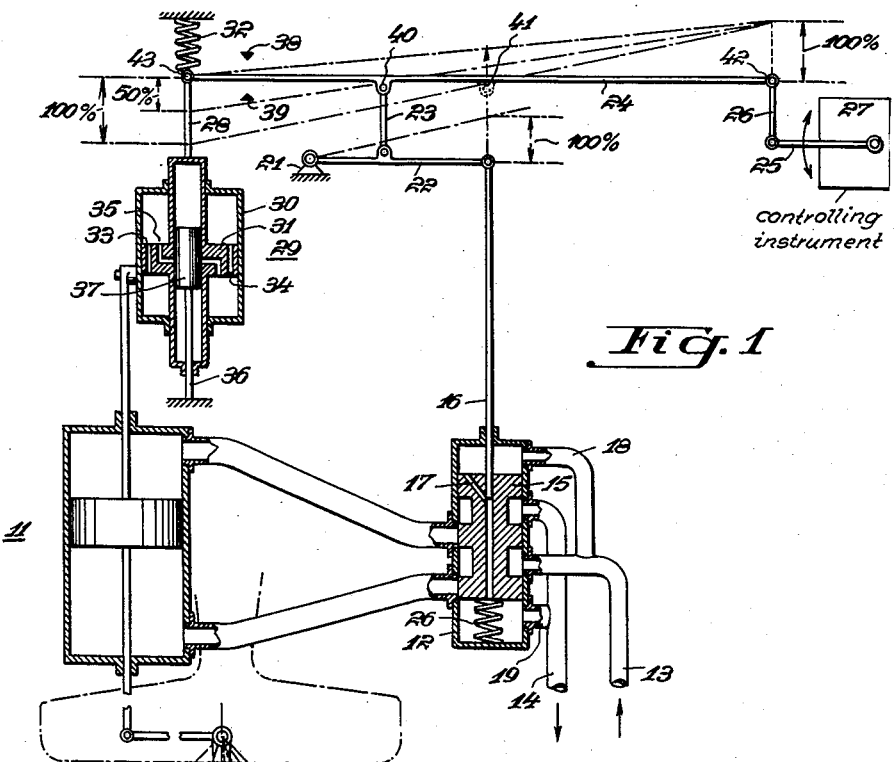
Figure 1 shows a control, in which a linkage or system of levers is inserted between the differential lever and the pre-controlling needle.

In the lateral rudder control according to Figure 1 the rudder 10 is adjusted by the hydraulic cylinder engine 11, whose two chambers are connected to the control cylinder 12. The latter regulates in known manner the inflow and the outflow of the pressure medium, for instance, oil, entering by the duct 13 and leaving by the duct 14. The control slide consists of a suspended piston 15, having a bore inside and a pre-controlling duct 17 above, said duct being more or less strongly throttled by the precontrolling needle 16. This known pre-control acts in such a manner, that the suspended piston 15 follows the movements of the pre-controlling needle 16 quite closely, since on raising the pre-controlling needle the duct 17 is throttled to a lesser degree, so that the pressure oil entering the control slide above through the duct 18 can flow through this duct almost unhindered and can flow out again at 19. Hence, the spring 20 will press the suspended piston upwards in this case, until the needle 16 again throttles the duct 17 to such an extent, that the pressure of the spring balances the pressure of the oil being brought to bear on top of the suspended piston.

The pre-controlling needle 16 is linked to the lever 22, fulcrumed upon a stationary part 21 and actuated by the differential lever 24 by means of the link 23. To the differential lever 24 is transmitted the movement of the control instrument 27 by means of the lever 25 and the link 26. A return rod arrangement 28, set in motion by the piston rod of the rudder engine 11, acts on the other end of the differential lever 24. Between the engine 11 and the return rod arrangement 28 is located the yielding isodrome device 29, consisting of the damping cylinder 30, which is, for example, filled with oil, fastened to the piston rod of the engine 11, and the damping piston 31, movable in said damping cylinder 30, the piston rod of said damping piston being pivotally connected at 43 to the lever 24 by a link or rod 28. This pivotal connection or fulcrum 43 is also engaged by the resetting spring 32 for the piston 31.

The piston 31 has straight-lined flow openings 33, 34 which are continually open and cause a certain damping of the movement of the piston 31 in the cylinder 30. In addition, the piston 31 has still another and wide flow passage 35, normally closed by the inner piston 37 attached to the stationary rod 36, said passage 35 being opened, however, if, owing to a disturbance of the position of equilibrium of the airplane, due to uni-lateral and prolonged action, the piston 31 is in a position displaced to a certain extent in relation to the stationary piston 37. The cylinder 30 can then move rather freely over the piston 31. Finally, there are provided for differential lever 24, stationary stops 38 and 39, intended to prevent a sudden impermissibly large displacement of the lever, which, for instance, might have the result, of pulling the pre-controlling needle 16 out of the control slide 15.

The heretofore known rudder controls lacked the linkage 23, 22, lying between the fulcrum 40 of the differential lever 24 and the pre-controlling needle 16, the pre-controlling needle being, in such earlier constructions, connected directly to the differential lever 24, for instance, at the central point 41. Hence, the known rudder arrangement acted in such a manner, that with 100% upward displacement of the control point 42 the point 41 of the differential lever was also at the beginning moved upwards by its full amount, resulting in a corresponding displacement of the suspended piston 15. The engine 11 then swung the rudder in such a manner, that the engine simultaneously pulled down the point 43, over the yielding return 29, by fully 100% against the action of the spring 32, thus bringing the point 41 back to its original position and thereby making the control slide assume its locking position. It is obvious, that with the dimensions adopted the greatest displacement of the point 41, viz. the effective regulating movement, was only half as large as the control movement of the point 42 and the equally large return movement of the point 43. It is possible to have the pre-controlling needle 16 act in known manner, not on the centre of the differential lever, but, for example, further to the left, thereby obtaining the result that with a 100% displacement of the control point 42 the resetting of the control point 43 and in consequence thereof the deflection of the rudder is correspondingly less, for instance, only 80%. In this case, however, the effective regulating movement transmitted to the control slide will be correspondingly reduced, so that the unavoidable inaccuracy of the regulation effected by these control slides will have a correspondingly stronger influence.

But if, according to the invention, a linkage such as for instance 23, 22 is inserted between the differential lever 24 and the precontrolling needle 16, it becomes possible to keep the factor of proportionality between the movement of the rudder 10 and the control movement of the point 42 as small as desired, without thereby reducing the effective regulation movement in the control slide 15. As shown by the drawing, the movement of the fulcrum 40 of the differential lever will remain very small in this case, but its movement will be transmitted to the pre-controlling needle 16 by the lever 22 with corresponding increase, so that with a 100% deflection of the control point 42 and α, for instance, only 50% deflection of the rudder 10 the movement of the pre-controlling needle can, nevertheless, be made as large as the control movement of the point 42. For the normal service which the rudder of airplanes has to render in air traffic, only very small deflections of the rudder are required, for example, only one half or one third of the maximum deflections of the rudder. These maximum deflections α of the rudder are required only with the low speeds of the airplane in starting and landing. But the short-time disturbances occurring during the journey can be compensated by much smaller deflections, not exceeding, for example, the angle β. Such small range β for the pendulous deflections of the rudder is, by the way, desirable for the reason that continuous disturbance factors may occur around the axis of stability of the airplane, requiring a corresponding displacement of the neutral rudder position for continuously compensating such disturbance factors. If, for example, during the journey in a twin-engined airplane the right hand side engine breaks down, there is a continuous torque acting around the vertical axis, which can only be compensated by a corresponding mean swinging out of the lateral rudder 10, for example, around the angle γ. The short-timed disturbance factors, due to squalls and the like, around the vertical axis of the airplane are then compensated by pendulous deflections around this new neutral position of the rudder, which even together with the mean angle of deflection γ do not reach the highest permissible angle of deviation α.

Prolonged disturbances of the position of equilibrium require displacement of the neutral position of the rudder, which is made possible in known manner by the yielding member 29, 32 in the return by the fact, that the cylinder 30 can gradually move relatively to the piston 31, the latter being always returned to its normal position by the spring 32. This displacement is so strongly throttled by the flow passages 33, 34 in the piston 31, that it does not take place with the short-time deflections of the rudder required for compensating the effect of squalls. But if with multi-engined machines the airplane gets out of trim by the breakdown of one engine or an unsymmetric load distribution, the neutral position of the rudder 10 is displaced correspondingly and uni-laterally, so that the cylinder 30 gradually slides over the piston 31 the latter being slowly returned to its neutral position by the spring. Hence, the return rod arrangement is correspondingly shortened or lengthened, respectively, so that with neutral position of the control lever 25 the rudder has a deflection compensating the change of trim. If only the passages 33, 34 are opened, the resetting of the piston 31 will take place very slowly. But if with a sudden and strong current the deflection of the control lever 25 becomes very great, then the rudder 10 and, in consequence thereof, the return point 43 will be swung out very rapidly, so that the cylinder 30 and its piston 31 can be slid without noticeable relative displacement over the stationary piston 37, until the passage 35 becomes free. The piston 31 is then no longer driven, so that the cylinder 30 can slide over it without impediment. Hence, the deflection of the rudder required for the compensation of the pronounced change of trim is attained quickly, no further return of the point 43 taking place.

Figure 2:
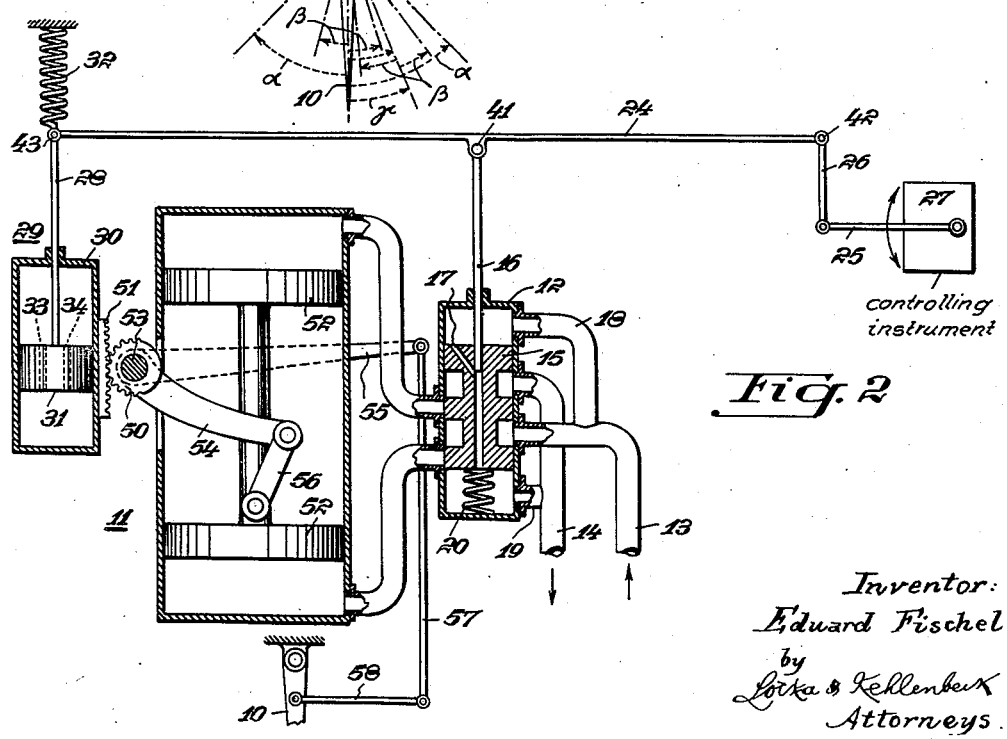
Figure 2 shows a control containing a transmission gear between the working piston and the isidrome box.

Figure 2 shows a further example of rudder control according to the invention. In this figure the parts corresponding to those of Figure 1, are designated with the same reference symbols.

According to Figure 2 the device for increasing the return movement is provided in form of a transmission gearing, consisting of a pinion 50 and a rack 51, between the piston 52 of the rudder engine 11 and the cylinder 30 of the isodrome arrangement 29. The pinion 50 is here arranged on the shaft 53 of an angular lever 54, 55, the latter being connected, on the one hand, by means of the link 56 to the piston 52 of the rudder engine 11, and, on the other hand, to the rudder actuating linkage 57, 58. The ratio of transmission between the pinion 50 and the rack 51 is, for example, again so chosen, that only half of maximum deflection of the rudder will correspond to a 100% displacement of the control point 42, but that the movement transmitted to the return point 43 over the isodrome arrangement is so large, that the effective regulating movement of the control slide 15 is maintained in its original magnitude, notwithstanding the reduced deflection of the rudder.

In each of the embodiments illustrated, the rudder 10 constitutes a control surface, the rudder engine 11 constitutes a servomotor, while the elements 28 to 43, 24, 23, 22, 16 of Fig. 1, and 28 to 34, 50, 51, 53, 54, 56, 41, 42, 43, 24, 16 of Fig. 2 constitute a follow-up mechanism interposed between the servomotor and the control slide or control member 15, said mechanism including the isodrome arrangement or isostatic member 29, and the elements 25, 26 forming an operative connection between the controlling instrument 27 and said mechanism (and through it, the control member 15).

I claim as my invention:

1. An automatic control arrangement for aircraft, comprising a servomotor and connections therefrom to actuate a control surface of the craft, a control member governing the operation of said servomotor, a controlling instrument, a follow-up mechanism interposed between said servomotor and said control member, an operative connection between said controlling instrument and said follow-up mechanism, such mechanism including an isostatic member so constructed as to permit a movement of the control surface at least twice as great as the movement which said surface is given by the movement of said controlling instrument.

2. An automatic control arrangement for aircraft, comprising a servomotor and connections therefrom to actuate a control surface of the craft, a control slide governing the operation of said servomotor and provided with a passage, a controlling instrument, a follow-up mechanism interposed between said servomotor and said control slide, said mechanism including a needle which controls said passage, a lever operatively connected with said controlling instrument, another lever operatively connected with said needle, a link connected with said levers at points between the fulcrums of the levers and their connections with the controlling instrument and with the needle respectively, and an isostatic member interposed between the servomotor and the fulcrum portion of said first-mentioned lever.

3. An automatic control arrangement for aircraft, comprising a servomotor and connections therefrom to actuate a control surface of the craft, a control member governing the operation of said servomotor, a controlling instrument, a follow-up mechanism interposed between said servomotor and said control member, an operative connection between said controlling instrument and said follow-up mechanism, such mechanism including an isostatic member comprising two relatively movable elements one of which is operatively connected with said controlling instrument, a rack on the other of said elements, a pinion in mesh with said rack, and an operative connection between the servomotor and said pinion.

4. A control arrangement according to claim 2, in which the parts are so proportioned that a motion of the fulcrum of said first-mentioned lever which is at most one-half of the maximum motion which said fulcrum can perform, will restore said needle to its original position.

EDUARD FISCHEL.